C. L. SACKRIDER.
TIRE SPRING.
APPLICATION FILED OCT. 23, 1917.

1,260,066.

Patented Mar. 19, 1918.

WITNESSES

INVENTOR
Claud L. Sackrider
BY
ATTORNEYS

UNITED STATES PATENT OFFICE.

CLAUD L. SACKRIDER, OF BATTLE CREEK, MICHIGAN.

TIRE-SPRING.

1,260,066.  Specification of Letters Patent.  Patented Mar. 19, 1918.

Application filed October 23, 1917. Serial No. 198,108.

*To all whom it may concern:*

Be it known that I, CLAUD L. SACKRIDER, a citizen of the United States, and a resident of Battle Creek, in the county of Calhoun and State of Michigan, have invented a new and Improved Tire-Spring, of which the following is a full, clear, and exact description.

My invention relates to spring means adapted to be inserted in a tire casing to act as a substitute for a pneumatic inner tube. More particularly the invention relates to a tire spring having series of spring elements alternating with each other and restraining means in the form of side rings to which the respective series are connected, the said elements being in bowed form and overlapping at their inner ends to bear directly against the demountable rim.

The nature of the invention will more clearly appear as the description proceeds.

Reference is to be had to the accompanying drawings forming a part of this specification in which similar reference characters indicate corresponding parts in all the views.

Figure 1:
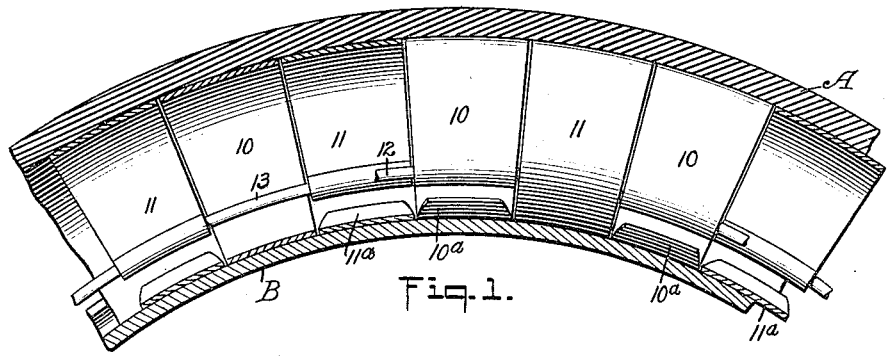
Figure 1 is a side elevation partly in section, showing a portion of a tire spring embodying my invention and portions of a demountable rim and tire casing.
Figure 2:
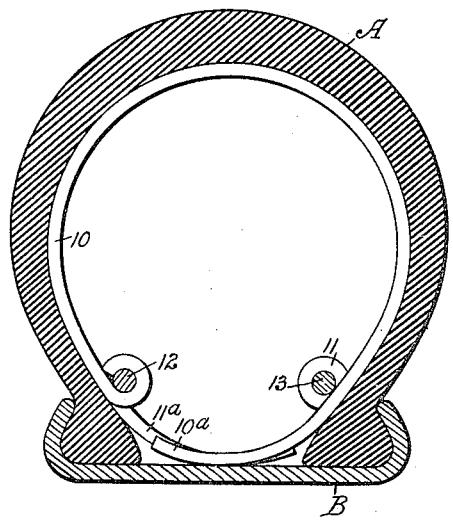
Fig. 2 is a cross section thereof on an enlarged scale.
Figure 3:
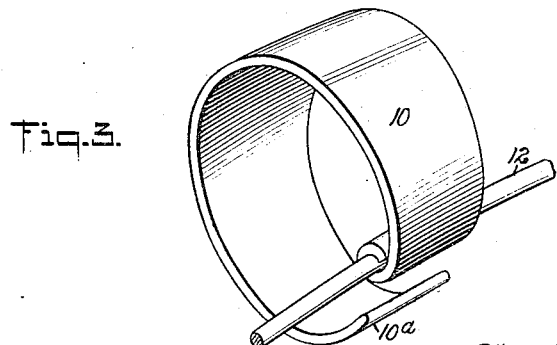
Fig. 3 is a perspective view of one of the spring elements forming part of my improved spring, and a portion of one of the rings associated with said elements.

In carrying out my invention in accordance with the illustrated example, two annular series of bowed spring elements are provided, the elements of the two series being designated respectively by the numerals 10 and 11. The spring elements 10, 11 of the two series alternate and in connection with each series a ring is employed, these being designated respectively by the numerals 12 and 13. The rings are separated laterally so that each is adjacent to a side of the spring and at the interior thereof.

The spring thus made up of the elements 10, 11, 12, 13, is adapted to be inclosed within a tire casing A which may be of any approved form, here shown as of the clencher type. The spring is intended more particularly for use with a demountable rim indicated at B and here shown conventionally, it being understood that any approved demounting means may be adopted in practice.

Each spring element is connected at one end with a ring 12 or 13, the elements 10 of one series being bent or looped around the ring 12 and the elements 11 being bent or looped about the ring 13. Each spring element 10 or 11 extends in bowed form from the ring to which it is secured and outside of the opposite ring, the terminals of the respective elements 10, 11 being curved laterally inward and overlapping one another radially inward from the rings 12, 13. The overlapped free ends $10^a$, $11^a$ of the spring elements are thus adapted to bear resiliently against the demountable rim B. By the described arrangement the spring will respond to pressure on the tire casing A, the rim B receiving the pressure of the spring, whereby the casing will be maintained expanded.

The elements 10, 11 are formed of sheet metal or plate metal presenting, when assembled, broad surfaces to the interior of the casing A and thereby presenting a protecting medium over substantially the whole interior surface of the said casing.

In the preferred form the rings 12, 13 are formed of round wires or rods. I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. A tire spring adapted to be inserted within a tire casing to be confined therein, for exerting its pressure against said casing and against a tire rim, said spring including two series of separate bowed spring elements, the elements of the respective series alternating, and a ring at each side of the spring within the same, the spring elements of each series being secured to one ring and extending in curved form outside of the other ring, the free ends of the spring elements extending laterally in opposite directions and overlapping radially inward from said rings to bear resiliently against the tire rim.

2. A tire spring including two series of separate bowed spring elements, the elements of the respective series alternating, and a ring at each side of the spring, the said elements of each series being secured to one ring and extending in curved form outside of the ring at the opposite side, the ends of the spring opposite the secured ends overlapping radially inward from the said rings and being free to bear resiliently against a tire rim.

3. A tire spring including two laterally separated rings and two series of spring elements, the elements of the respective series alternating, the elements of each series being secured, adjacent to an end of each, to one ring and extending in bowed form therefrom past the ring at the opposite side and bearing laterally against the latter, the free ends of the spring elements curving laterally inward and overlapping one another radially inward from the rings.

CLAUD L. SACKRIDER.

Copies of this patent may be obtained for five cents each, by addressing the "Commissioner of Patents, Washington, D. C."